United States Patent

[11] 3,552,539

| [72] | Inventor | Donald E. Rutter |
| | | Rockford, Ill. |
| [21] | Appl. No. | 758,087 |
| [22] | Filed | Sept. 6, 1968 |
| [45] | Patented | Jan. 5, 1971 |
| [73] | Assignee | Dixon Automatic Tool, Inc. |
| | | Rockford, Ill. |
| | | a corporation of Illinois |

[54] MACHINE FOR FEEDING WORKPIECES
10 Claims, 10 Drawing Figs.

| [52] | U.S. Cl. | 198/33, |
| | | 221/156 |
| [51] | Int. Cl. | B65g 47/24 |
| [50] | Field of Search | 198/33(IR); |
| | | 221/156 |

[56] References Cited

UNITED STATES PATENTS

| 3,063,543 | 11/1962 | Schneider | 198/33.1 |
| 3,254,753 | 6/1966 | Aidlin | 198/33(R1) |

*Primary Examiner*—Richard E. Aegerter
*Attorney*—Wolfe, Hubbard, Leydig, Voit & Osann

ABSTRACT: Pins with elongated bodies and enlarged heads are transferred at rapid rates from an open-sided, rotatable drum to a delivery chute as they gravitate along a multichanneled tray projecting into the open side of the drum to catch the pins. The tray is formed with a series of spaced slots which are sized to hold the heads of the pins while permitting the bodies to swing downwardly through the slots thereby to turn all of the pins into upright positions before the pins are delivered to the chute. The drum is rotatably supported and driven solely along its outer periphery to avoid obstructing and filling up the interior of the drum with supporting structure.

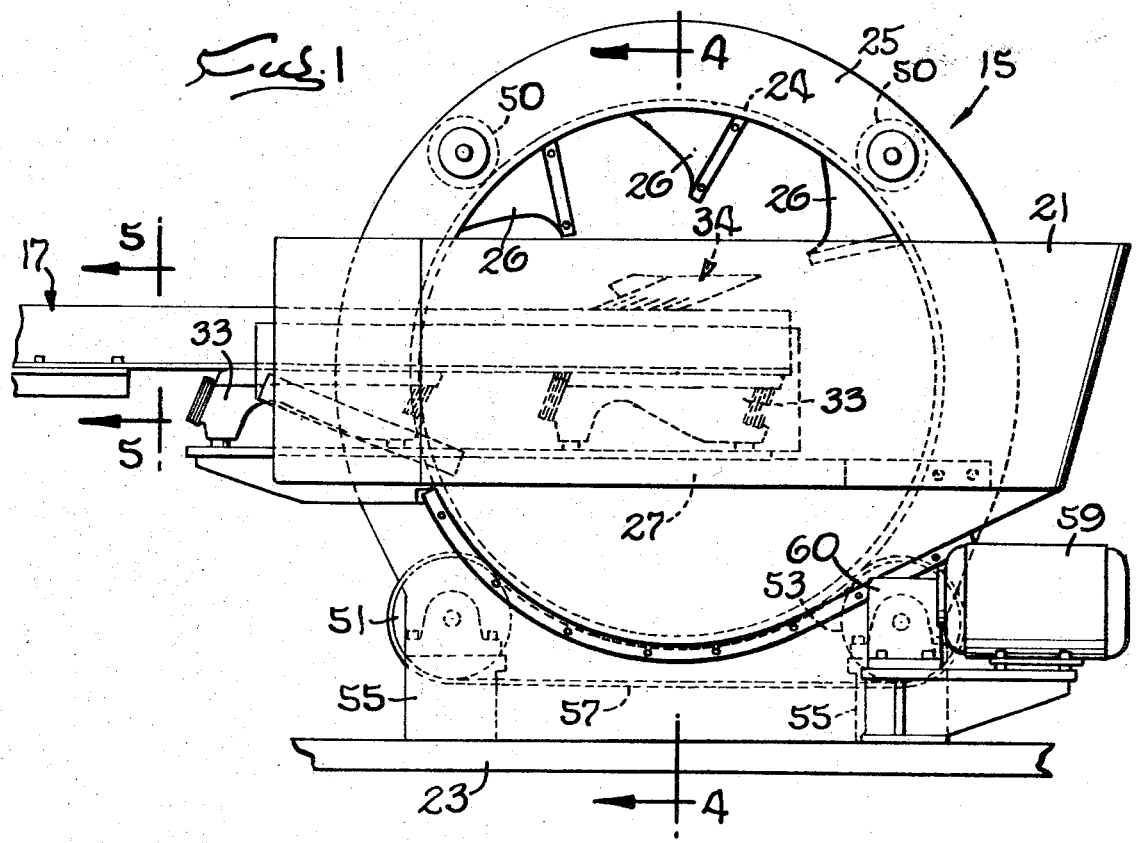

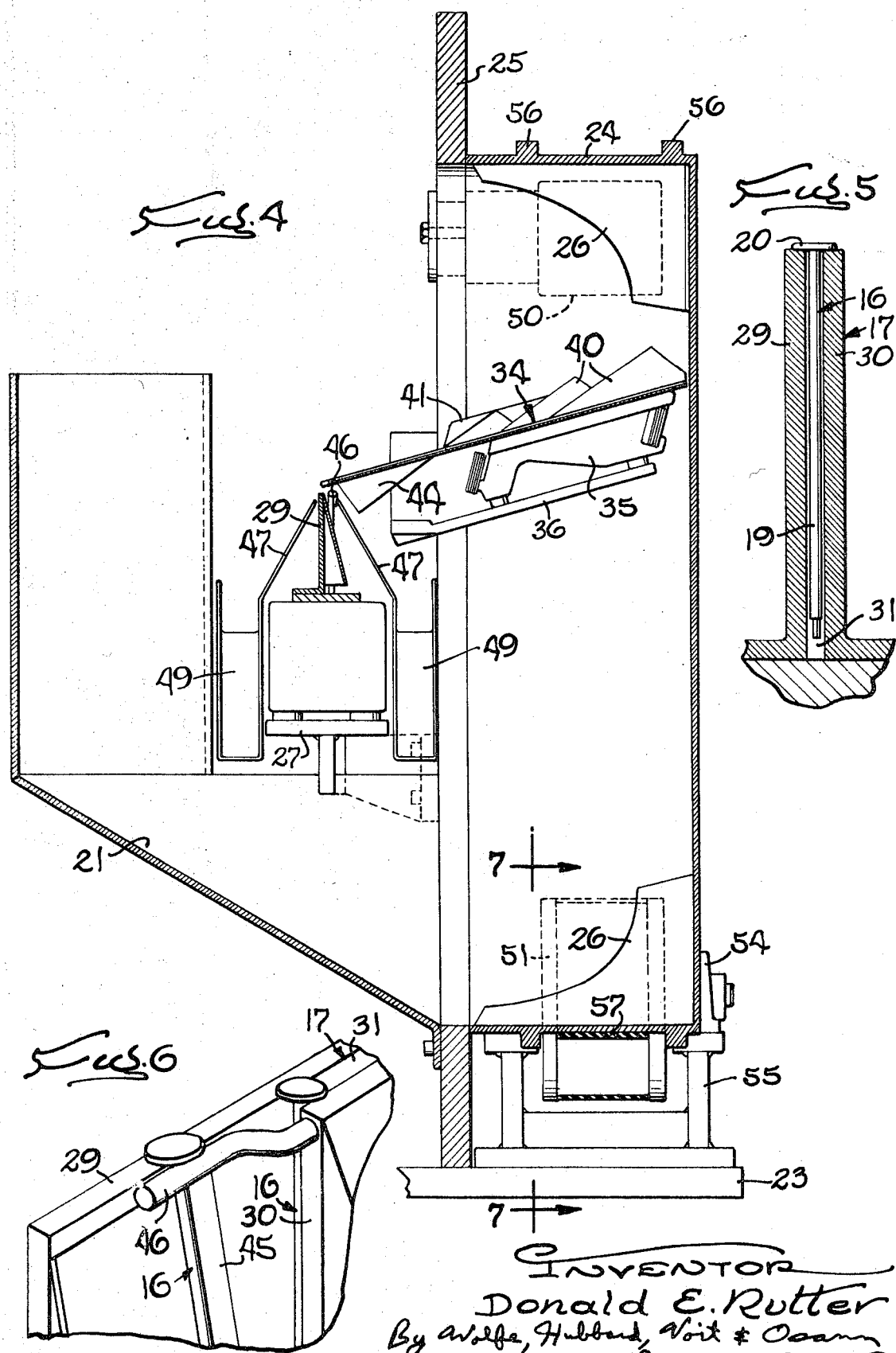

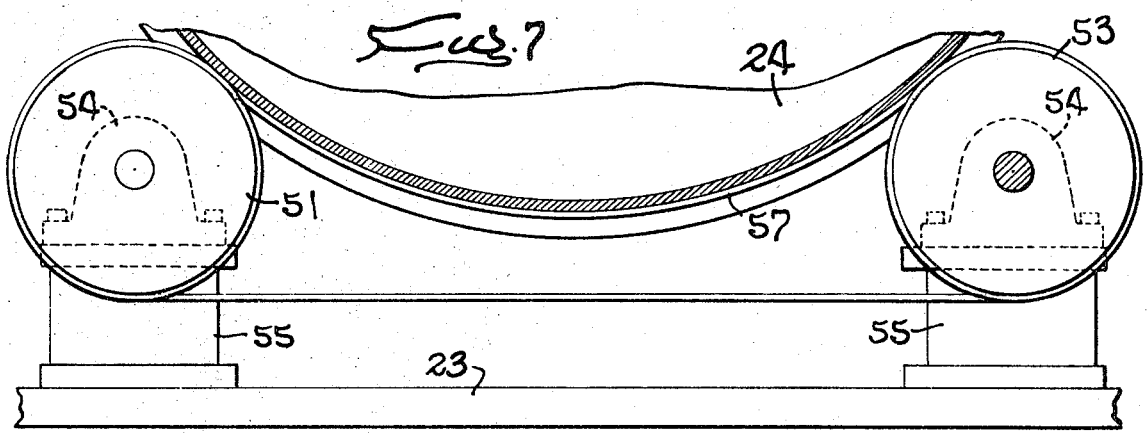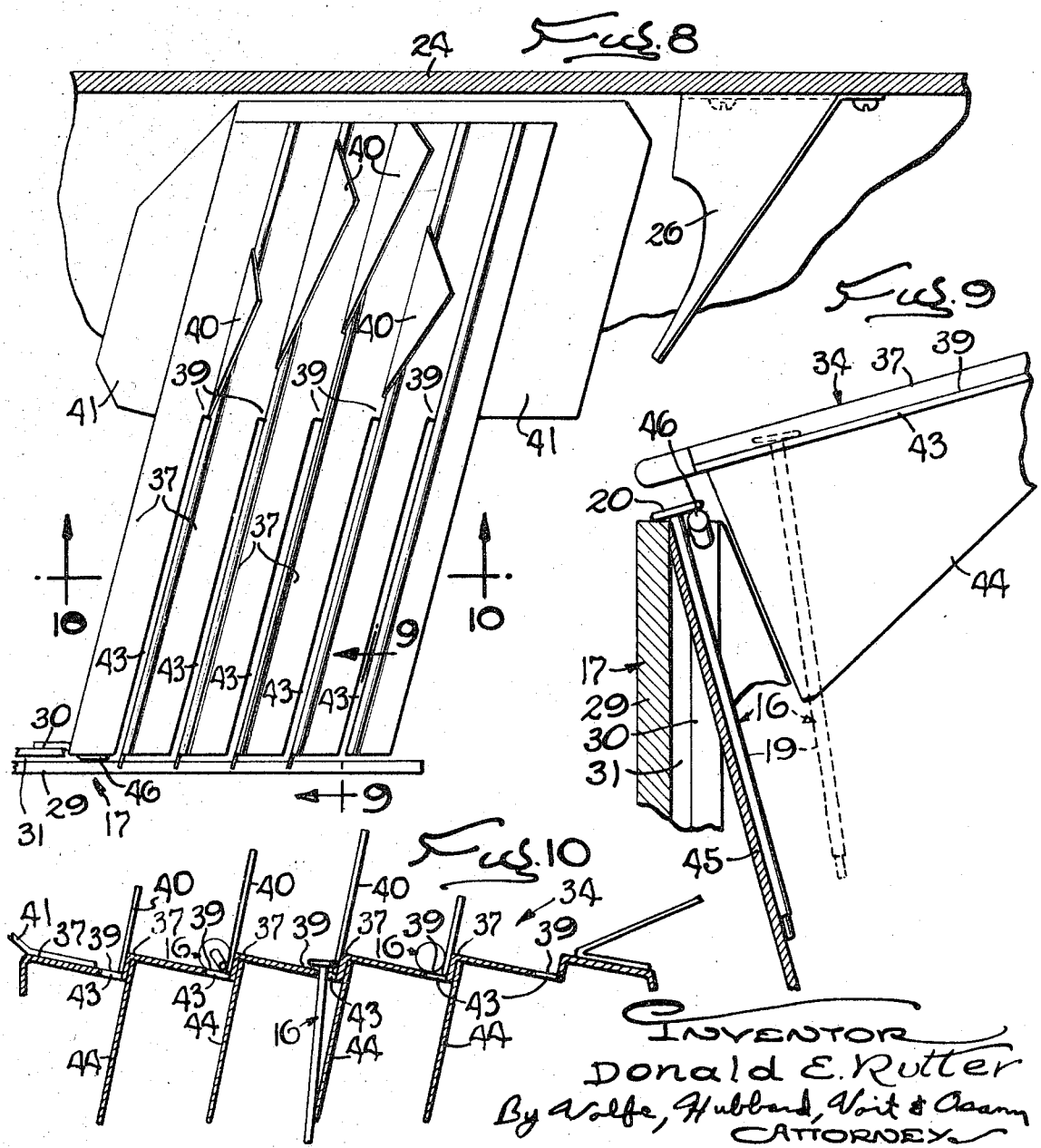

3,552,539

MACHINE FOR FEEDING WORKPIECES

BACKGROUND OF THE INVENTION

This invention relates to a machine for feeding workpieces to an assembly station and, more particularly, to a machine for feeding workpieces such as pins formed with elongated bodies and enlarged heads. Typical machines of this type include an open-sided, rotatable drum for picking up randomly arranged pins from a supply hopper and for transferring the pins to an elongated delivery chute operable to feed the pins one-by-one to the assembly station in upright positions with the heads of the pins facing upwardly. In order to be presented properly to the assembly station, all of the pins arranged randomly in the drum must be oriented into identical upright positions after leaving the drum and before reaching the assembly station.

SUMMARY OF THE INVENTION

The primary object of the present invention is to feed more pins along the delivery chute at a faster rate than heretofore has been possible and to reduce the gaps between successively fed pins by orienting the pins into upright positions before they are transferred to the chute. In large, this is achieved through the provision of a novel multichanneled tray located between the drum and the chute to receive the pins from the drum and to orient the pins properly while delivering the latter to the chute. Advantageously, a multiplicity of randomly disposed pins are dropped simultaneously from the drum onto the tray and fall into the channels of the tray for movement toward the chute along a number of separate paths. The channels are uniquely formed to turn the pins into upright positions and to feed several properly oriented pins into the chute at the same time in closely spaced side-by-side relation to reduce the gaps between adjacent pins in the chute and to enable more pins to be fed along the chute in a given period of time.

A further object of the invention is to increase the capacity of the drum by rotatably supporting the drum on its outer periphery to avoid obstructing the interior of the drum with supporting structure.

Other objects and advantages of the invention will become apparent from the following detailed description when taken in connection with the accompanying drawings.

BRIEF DESCRIPTION OF THE DRAWINGS

FIG. 1 is a fragmentary side elevation of a new and improved workpiece-feeding machine embodying the novel features of the present invention.

FIG. 2 is a fragmentary plan view of the machine shown in FIG. 1.

FIG. 3 is a perspective view of an exemplary workpiece adapted to be handled by the machine.

FIG. 4 is an enlarged fragmentary cross section taken substantially along the line 4—4 of FIG. 1.

FIG. 5 IS an enlarged fragmentary cross section taken substantially along the line 5—5 of FIG. 1.

FIG. 6 is an enlarged fragmentary perspective view of parts shown in FIG. 4.

FIG. 7 is a fragmentary cross section taken substantially along the line 7—7 of FIG. 4.

FIG. 8 is an enlarged fragmentary plan view of parts shown in FIG. 4.

FIG. 9 is an enlarged fragmentary cross section taken substantially along line 9—9 of FIG. 8.

FIG. 10 is an enlarged fragmentary cross section taken substantially along the line 10—10 of FIG. 8. DETAILED DESCRIPTION OF THE PREFERRED EMBODIMENT As shown in the drawings for purposes of illustration, the invention is embodied in a machine 15 for feeding workpieces 16 (FIG. 3) one-by-one along an elongated delivery chute 17 to an assembly station (not shown) at one end of the chute where the workpieces are joined to other parts by automatic assembly apparatus (not shown). The exemplary workpieces shown herein are in the form of pins (FIG. 3) having elongated bodies 19 topped by enlarged heads 20.

In this instance, a large supply of pins 16 is stored in an upwardly opening hopper 21 mounted above a rigid base 23 and opening at its lower end into an open-sided, cylindrical drum 24 which is supported on the base for rotation about a generally horizontal axis. An annular ring 25 is fixed to the base encircles the open side of the drum and supports the hopper on the base adjacent the drum. Pins dumped into the hopper eventually gravitate into the bottom of the drum and, as the drum rotates, are picked up and carried around to the upper side of the drum by a plurality of transfer elements or scoops 26 spaced angularly around the inner periphery of the drum. Upon reaching the top of the drum, the pins fall from the scoops and are transferred to the delivery chute 17 for feeding to the assembly station.

As shown most clearly in FIGS. 1 and 4, the delivery chute 17 extends transversely of the axis of the drum 24 along the open side thereof and is supported above a horizontally extending shelf 27 fastened to one side of the ring 25. The chute is formed by a pair of side-by-side plates 29 and 30 (FIG. 5) which are spaced laterally from another to define a vertical slot 31 extending longitudinally of the chute and adapted to receive the pins 16. The width of the slot is such that pins delivered from the drum are fed one-by-one along the chute with their bodies 19 located in upright positions in the slot and with their heads 20 facing upwardly and hanging from the upper edges of the plates as shown in FIG. 5, this being the orientation required for further handling of the pins at the assembly station. Two vibratory units 33 (FIG. 1) underlying the chute 17 and supporting the latter on the shelf 27 continuously shake the chute in a longitudinal direction to advance the pins downstream along the slot from the drum toward the assembly station.

Because the pins 16 are arranged and positioned indiscriminately when delivered from the drum 24 and because all of the pins must be transferred to the assembly station in upright positions, it is necessary to orient the pins in identical fashion before the latter arrive at the assembly station. According to the primary aspect of the present invention, several randomly arranged pins transferred from the drum are oriented identically and turned simultaneously into upright positions prior to being delivered to the chute 17 so that more pins may be fed into the chute in a given period of time to enable faster feeding of the pins along the chute to the assembly station. To these ends, a unique multichanneled tray 34 is positioned to catch a large number of the pins as they are dropped from each scoop 26 and is constructed to turn the pins into upright positions while transferring the pins to the chute. The tray causes several properly oriented pins to be delivered to the chute at the same time and in closely spaced side-by-side relation to reduce the spacing or gaps between successive pins moving along the chute and to enable consecutive feeding of the pins to the assembly station without delays as otherwise would be incurred if the pins were spaced apart from one another on the chute as a result of being moved lengthwise along part of the chute.

In the present instance, the tray 34 is made from a rectangular piece of sheet metal and is inclined downwardly from the drum 24 toward the chute 17 with its lower edge portion overlying the chute and with its upper edge portion projecting into the open side of the drum (see FIG. 4). Several pins 16 (e.g., 30) dropped by each of the scoops 26 moving around to the upper side of the drum are caught by the tray and gravitate downwardly along the upper surface thereof toward the chute. Preferably, movement of the pins along the tray is promoted by a vibratory unit 35 (FIG. 4) underlying the tray and supporting the latter on a shelf 36 which is fastened to the ring 25.

As the pins 16 start downwardly along the tray 34, they are divided for movement along a number of separate paths and are turned automatically from randomly arranged positions into properly oriented upright position. For these purposes, the upper surface of the tray is formed with series of raised ridges 37 and depressed channels 39 (FIG. 8 and 10) extending along the length of the tray and alternating with one another across the width of the tray. As the pins are dropped, they are caught by the ridges and are guided downwardly into the channels for lengthwise gravitation along the channels in several paths, there being five channels and thus five paths in this instance. Turning of transversely extending pins into the channels is facilitated by a plurality of upstanding teeth 40 projecting upwardly from the upstream portion of the tray adjacent the ridges to comb through the pins as they are dropped onto the tray. Also, a pair of upwardly inclined wings 41 along the side edges of the tray help divert the pins onto the tray and into the channels.

To orient the pins 16 into upright positions, an elongated slot 43 FIGS. 8 and 10) opens out of the bottom of each channel 39 just downstream from the teeth 40 and is defined by generally parallel side edges which are spaced apart only sufficiently far to allow the bodies 19 of the pins to swing downwardly through the slot (see FIGS. 8 and 9) while catching the heads 20 of the pins thereby to deliver the pins to the downstream end of the tray 34 in upright positions with the heads facing upwardly and hanging from the edges of the slot. Accordingly, each pin delivered into one of the channels is turned into an upright position automatically as an incident to its body swinging downwardly through the slot 43 regardless of whether the pin entered the channel headfirst or headlast. Laterally spaced and depending walls 44 advantageously are attached to the underside of the tray along one side of each slot 43 to engage the bodies of the pins after the bodies fall through the slots and to prevent the pins from swinging laterally into positions where the heads could drop off the edges of the slots.

As shown most clearly in FIGS. 8 and 9, the slots 43 open out of the lower edge of the tray 34 and are located just above the plate 29 of the chute 17, this plate being extended beneath the tray while the plate 30 terminates just short of the tray. Thus, the properly oriented pins 16 gravitating downwardly in the slots drop from the open ends of the slots and their heads 20 are caught by the upper edge of the plate 29 as shown in FIGS. 6 and 9. An inclined wall 45 fastened to the plate 29 assists in keeping the pins hanging from the plate as they are advanced downstream and, once past the tray, the pins are permitted to swing into vertical positions and to pass into the delivery slot 31 between the plates 29 and 30 for advancement to the assembly station. A finger 46 (FIG. 6) located near the upstream end of the plate 30 helps guide the pins into the slot 31. Any pins which might drop before entering the slot 31 slide down inclined ramps 47 (FIG. 4) at the sides of the chute and are delivered back to the hopper 21 through return chutes 49 located at the lower margins of the ramps.

Because the pins 16 are fed to the chute 17 by way of the five slots 43, it is possible to feed five pins to the chute at one time thus effecting rapid loading of the chute. Since the spacing between successive pins usually will be not greater than the lateral spacing between adjacent slots, the pins are delivered to and proceed along the chute in closely spaced side-by-side relation without gaps of substantial length existing between adjacent pins. Accordingly, a comparatively large number of pins can be fed to the assembly station in properly oriented positions in a relatively short period of time, the machine herein being capable of feeding the pins at a rate as high as 350 pins per minute. With the pins being oriented by the tray 34 before entering the chute, the latter need not be used for this purpose and thus may be reduced in length.

The present invention also contemplates rotatably supporting the drum 24 on its outer periphery in order to avoid the need of projecting supporting structure into the interior of the drum. In this way, the interior of the drum is unobstructed to increase the workpiece capacity of a drum of given diameter and to enable easier and more convenient access to workpieces within the drum. Also, with the interior of the drum free of supporting structure, the tray 34 may be located properly within the drum without the necessity of enlarging the drum.

As shown in FIGS. 2 and 4, the drum 24 is supported along its upper side by a pair of rollers 50 engageable with the outer periphery of the drum and rotatably mounted on the ring 25. On its lower side, the drum is cradled by a pair of spaced rollers 51 and 53 (FIG. 7) which are journaled in bearings 54 supported on pedestals 55 on the base 23. The various rollers fit between axially spaced flanges 56 (FIG. 4) encircling the periphery of the drum and thus restrict axial movement of the drum as well as preventing the drum from tilting angularly about its axis.

Trained around and tensioned between the lower rollers 51 and 53 is an endless belt 57 (FIG. 7) which frictionally engages the underside of the drum 35 to turn the latter when the roller 53 is rotated. Rotation of the roller 53 is effected by an electric drive motor 59 (FIG. 1) which is coupled to the roller through reduction gearing 60. Accordingly, the drum not only is supported along its outer periphery but also is exteriorly rotated to eliminate obstruction of the interior of the drum with drive and supporting shafts which otherwise would have to be projected into the drum.

I claim:

1. A machine for feeding workpieces having elongated bodies and enlarged heads, said machine including an elongated chute for receiving the workpieces and delivering the same one-by-one to one end of the chute in upright positions with the heads of the workpieces facing upwardly, an open-sided drum mounted alongside the other end of said chute to turn about a generally horizontal axis extending transversely of the chute, a hopper disposed adjacent said drum for storing a supply of workpieces and for delivering the same to the bottom of the drum, a plurality of transfer elements spaced angularly around the inner periphery of the drum, and means operable to rotate the drum whereby said transfer elements pick up a multiplicity of workpieces, carry the workpieces to a location above the chute and thereafter drop the workpieces, the improvement in said machine comprising, a tray inclined downwardly from said drum toward said chute and located with its lower edge portion adjacent the chute and with its upper edge portion projecting into the open side of the drum to catch the workpieces dropped by said transfer elements, a series of ridges and channels extending along and arranged alternately across the upper side of the tray with the ridges guiding the dropped workpieces into the channels for lengthwise gravitation down the tray along a number of separate paths, elongated slots opening out of the bottoms of the channels and defined by generally parallel edges spaced apart to catch the heads of the workpieces while permitting the bodies to swing downwardly through the slots, and openings at the ends of the slots adjacent the lower edge portion of the tray to enable the workpieces to drop from the tray and onto the chute whereby the workpieces are delivered to the chute in upright positions with the heads facing upwardly.

2. A machine as defined in claim 1 in which said slots in said tray open out of the lower edge portion of the tray to enable the workpieces to slide from the tray and onto the chute.

3. A machine as defined in claim 1 further including a series of walls depending from the underside of said tray adjacent the edges of said slots to engage the bodies of the workpieces and restrict lateral swinging of the latter within the slots.

4. A machine as defined in claim 1 further including a series of teeth upstanding from the upper side of said tray alongside said ridges to turn the dropped workpieces into position to fall lengthwise into said channels.

5. A machine as defined in claim 1 further including a vibratory unit underlying and supporting said tray and operable to shake the latter to promote movement of the workpieces along the tray.

6. A machine as defined in claim 1 further including a base, and means on said base engageable with the outer periphery of said drum to journal the latter for rotation about said axis and constituting the sole rotational support for the drum on the base whereby the interior of the drum is unobstructed by such support.

7. A machine for feeding workpieces having elongated bodies and enlarged heads, said machine comprising an elongated chute for receiving the workpieces and delivering the same one-by-one to one end of the chute in upright positions with the heads facing upwardly, and an open-sided drum mounted alongside the other end of said chute to turn about a generally horizontal axis extending transversly of the chute whereby workpieces delivered to the bottom of the drum are carried around toward the top of the drum to a location above the chute and are dropped as an incident to rotation of the drum, the improvement in said machine comprising, a tray extending from said drum toward said chute and located with one of its ends adjacent the chute and with the other of its ends projecting into the open side of the drum to catch the dropped workpieces, a series of elongated slots extending along and spaced across said tray and defined by opposite side edges spaced apart to hold the heads of the workpieces while permitting the bodies to swing downwardly through the slots, and openings at the ends of the slots adjacent the chute to enable the workpieces to drop from the tray and onto the chute whereby the workpieces are delivered to the chute in upright positions with the heads facing upwardly.

8. In a machine for feeding workpieces, the combination of, a base, an elongated chute mounted on said base for receiving workpieces at one end and for delivering the workpieces along a predetermined path, an open-sided rotatable drum positioned alongside said one end of said chute and having a series of workpiece transfer elements spaced angularly around its inner periphery, a hopper disposed opposite the open side of the drum for storing a supply of workpieces and for delivering the same to the bottom of the drum whereby the transfer elements pick up and carry the workpieces toward the top of the drum and then drop the workpieces when the drum is rotated, a tray extending from said one end of said chute and projecting into the open side of the drum for catching the cropped workpieces and delivering the same to the chute, means on said base engageable with the outer periphery of the drum to journal the latter for rotation about a generally horizontal axis extending transversely of the chute and constituting the sole rotational support for said drum on said base whereby the hopper and the interior of the drum are unobstructed by such support, and mechanism for rotating said drum about said axis.

9. A machine as defined in claim 8 in which said rotating mechanism comprises means frictionally engageable with the outer periphery of the drum.

10. In a machine for feeding workpieces, the combination of, a base, an elongated chute mounted on said base for receiving workpieces at one end and for delivering the workpieces along a predetermined path, an open-sided drum positioned alongside said one end of said chute for holding a supply of workpieces and rotatable to carry the workpieces above said one end of said chute for delivery to the latter, means on said base engageable with the outer periphery of the drum to support the drum on said base and to journal the drum for rotation about a generally horizontal axis, and mechanism for turning the drum about said axis.